Dec. 8, 1964  R. K. NOLTE  3,160,262
PAN WASHING MACHINE
Original Filed May 23, 1961  2 Sheets-Sheet 1
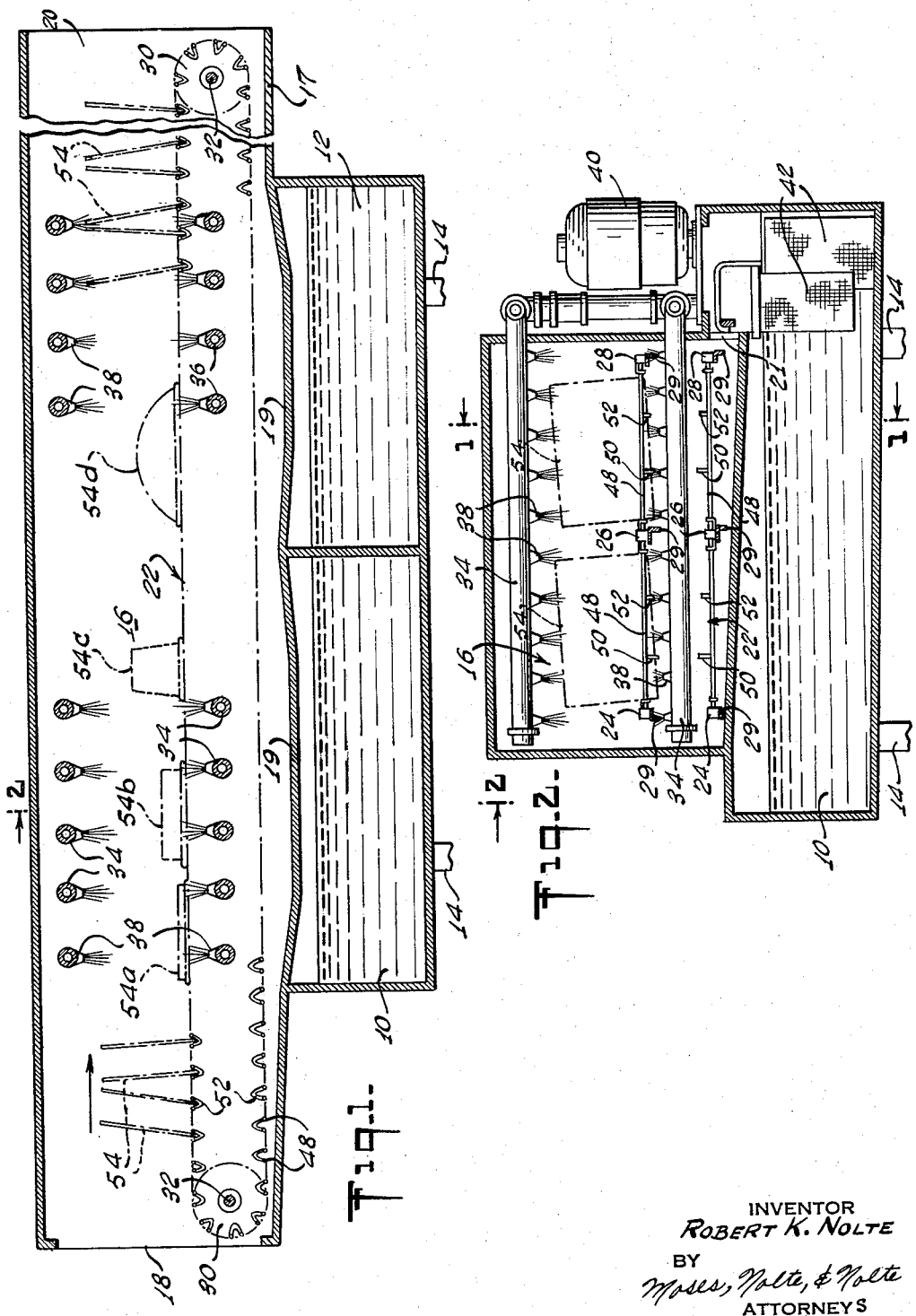
INVENTOR
ROBERT K. NOLTE
BY
Moses, Nolte, & Nolte
ATTORNEYS

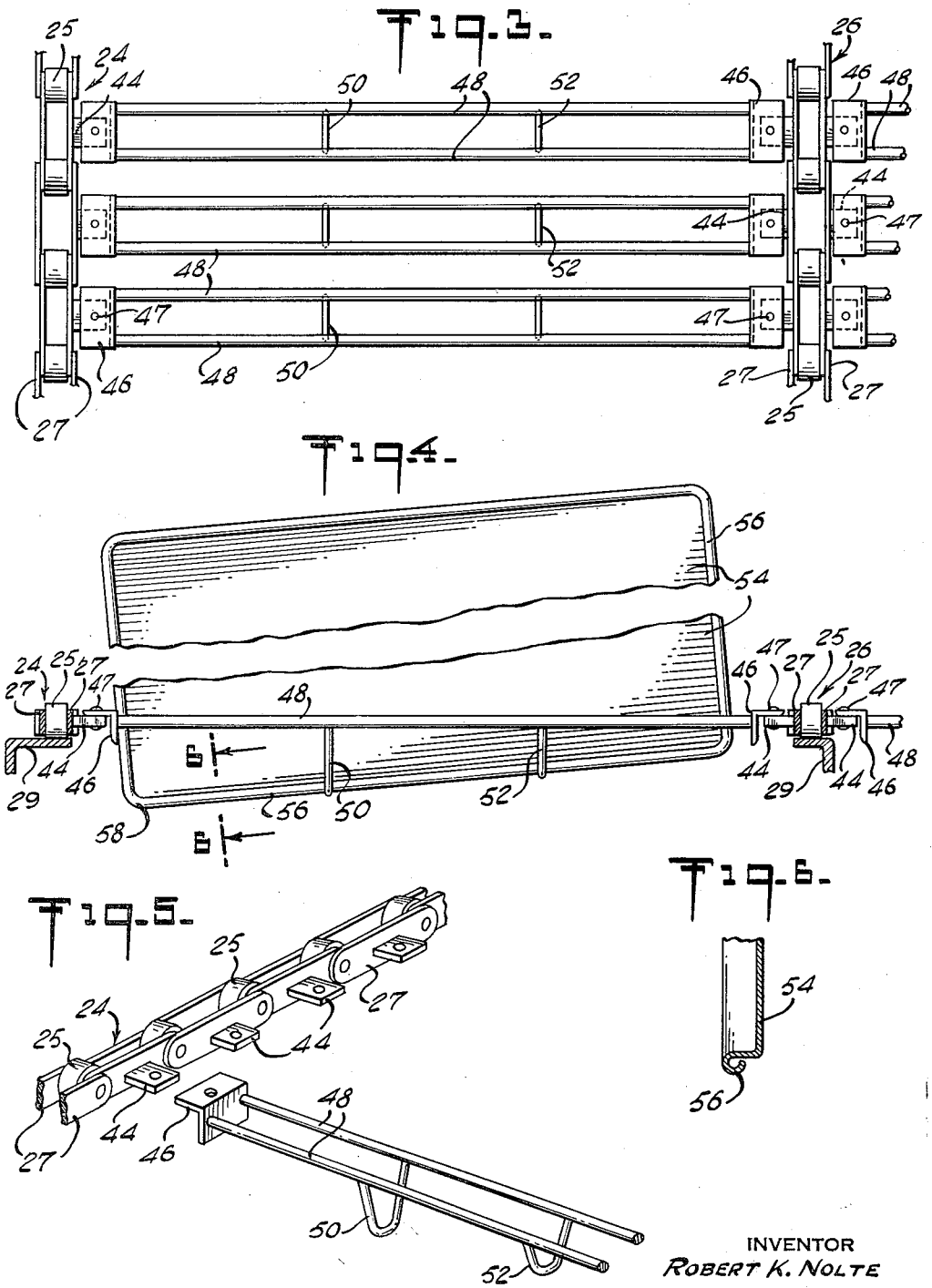

United States Patent Office 3,160,262
Patented Dec. 8, 1964

3,160,262
PAN WASHING MACHINE
Robert K. Nolte, Chatham, N.J., assignor to Metalwash Machinery Company, Elizabeth, N.J., a copartnership
Continuation of application Ser. No. 111,941, May 23, 1961. This application Apr. 6, 1962, Ser. No. 186,828
6 Claims. (Cl. 198—134)

This invention relates to bakery pan washing machines in general, and in particular, to improved conveyor means for holding articles passing through an endless conveyor tunnel-like washing machine at both angles inclined to the horizontal and also in horizontal relation. This is a continuing application of the application for U.S. Letters Patent, Serial No. 111,941 filed on May 23, 1961, now abandoned.

In machines of this type, wherein the bakery pans to be washed are placed upon an endless conveyor for passage through a series of spray washing, spray rinsing and drying chambers, it is very desirous that all portions of the bakery pan be properly washed and rinsed and that no undrained pockets of rinse water remain in the pan at the delivery end of the machine. In prior art machines of this type, a conventional flexible wire mesh conveyor was employed allowing placement of the pans in a horizontal position thereon. However, in machines employing a conventional mesh conveyor, the rolled edges of the overturned pans collect washing solution that will not drain completely by gravity, thus requiring a prolonged high temperature drying cycle. A further disadvantage of horizontal pan placement in washers of this type is that of relatively low production capacity due to the inefficient spaced out relationship of the horizontal pans.

A feature of the present invention, therefore, is to provide an improved conveyor means which allows vertical stacking of flat sheet baking pans, while at the same time permitting horizontal placement of pans and mixing bowls of deeper dimension.

A further feature of the improved conveyor means is that the pans held thereon in a near vertical position are inclined so that a minimum of sprayed wash or rinse solution or both accumulates within the rolled pan edge to prevent incomplete cleaning or excessively long time and/or high temperature requirements to positively dry those portions of the pan that trap liquid.

Another object of applicant's invention is to provide an improved conveyor means for a straight-line, tunnel-type bakery pan washing machine wherein either vertical or horizontal stacking of bakery pans is permissible.

Another object of the invention is to provide an improved pan washing machine having novel pan holding means so that substantially all of the washing liquid will drain from the pan at a lowermost point.

Another object of the invention is to provide an endless chain conveyor for pan washing machines having pan holding means adapted to maintain the bakery pan at an angle inclined to the horizontal.

A still further object of the invention is to provide endless chain conveyor means having a plurality of spaced pan holding bars attached to the side plates of the individual chain links.

Another object of the invention is to effectively increase the conveyor pan holding capacity by positioning the pans in a near vertical position rather than laying them flat on the conveyor.

Another object of the invention is to provide inclined holding means for pan washers so that substantially all of the washing solution will drain from the rolled edge of the pan.

A further object of the invention is to provide article supporting means for a bakery pan washer which is simple and durable in construction, versatile in use, easy to load and unload, trouble-free in operation, and economical to manufacture.

Other objects and advantages of the invention will become apparent and the invention will be more fully understood from the following description and drawings, in which:

FIG. 1 is a cross-sectional view of a typical pan washer incorporating the invention taken along line 1—1 of FIG. 2;

FIG. 2 is a cross-sectional view taken along line 2—2 of the pan washer of FIG. 1;

FIG. 3 is a fragmentary top plan view of a portion of applicant's novel inclined pan holding conveyor;

FIG. 4 is a view showing a typical pan placed within the pan supporting means of FIG. 3;

FIG. 5 is a fragmentary exploded perspective view showing the mode of attachment of the pan support means to the chain conveyor links; and FIG. 6 is a fragmentary cross-sectional view of the rolled edge of a typical bakery pan taken along line 6—6 of FIG. 4.

Referring to the drawings, the invention is illustrated in a typical apparatus used in cleaning various types of commercial baking pans and includes a lower tank portion having a washing solution reservoir 10 and a rinsing solution reservoir 12 supported by upstanding legs 14. An elongated, tunnel-shaped spray chamber shown generally at 16 and dryer 17 is provided with a pan loading entrance 18 at one end, and an unloading exit 20 at the opposite dryer section end. Mounted within the tunnel is an endless conveyor 22, which includes three spaced parallel endless chains 24, 26 and 28. Each chain is made of a plurality of links having rollers 25 and side link plates 27 pivotally secured by suitable pins passing therethrough. Each of the chains 24, 26 and 28 is mounted in a vertical plane about end sprocket means 30 which are in turn mounted upon shafts 32, one of which may be driven at the desired conveyor speed by a motor (not shown). The upper reach of each of the chains 24, 26 and 28 is supported by an angular brace member 29 to maintain a flat upper surface on the conveyor irrespective of chain tension.

The chamber 16 encloses a plurality of high pressure wash solution conduits 34 and rinse solution conduits 36 having spray nozzles 38, which are disposed above and below the upper reach of the chain conveyor 22 so that solution may be directed from the lower tank portions 10 and 12 by the high pressure pump 40 through suitable piping against the pans placed upon the conveyor. The wash and rinse water emitted from the nozzles 38 will drain to the inclined lower drain portions 19 of the chamber 16 through the openings 21 and strainers 42 respectively to the tanks 10 and 12 to permit reuse and recirculation by the pump 40. While only one pump 40 has been illustrated in association with tank 10, it should be appreciated that the tank 12 employs a similar pump for recirculation purposes. Suitable heating means (not shown) are included in the dryer 17 to evaporate any undrained rinse water remaining upon the baking pans as they emerge from opening 20.

Defining the novel chain conveyor arrangement more specifically shown in FIGS. 3–6, each of the chain link plates 27 is provided with a horizontally extending cross bar attachment lug 44, which may be secured thereto by welding. In the instance of the end chains 24 and 28, one such lug is provided on each inwardly facing link 27, while the central chain 26 carries a pair of opposed lugs 27 extending from each side of the chain. Secured to each of the lugs 44 by a loose fitting rivet or bolt 47 is an angle bracket 46. The angle brackets 46 serve to provide attachment points for a plurality of parallel pairs of cross bars 48, which are welded therebetween to provide a pocket for mounting the bakery pans in applicant's novel inclined manner and to also present a substantially horizontal surface for conventional face down mounting of pans 54a, 54b, 54c and 54d. Each pair of cross bars 48 carries a pair of depending U-shaped pan supports 50 and 52 which are secured at their upper ends to the bars 48. Pan support 50 has a deeper depending U portion than pan support 52 to allow the cocking of the pan to the desired drainage angle to completely drain the rolled edge 56 in the low point 58 of any residual washing solution. As can readily be seen, a typical pan 54 is placed between each pair of cross bars 48 into the notch formed by the pan supports 50, 52, at the loading entrance 18 and assumes the position of FIG. 4 for its travel through the chamber 16.

Thus, applicant's novel conveyor construction has provided a versatile means for holding baking pans in an upright or in a horizontal position in a tunnel-type pan washer. The improved conveyor means affords optimized draining of pans placed thereon in a vertical position to allow a shorter drying cycle and also allows higher density pan loading in a given running length of conveyor.

While applicant has illustrated his invention as employing lugs 44 and brackets 46 to secure the ends of each pair of bars 48 to each of the chain links 27, it will be readily understood by those skilled in the art that alternate means could be employed therefor, or that the ends of the bars 48 could be welded directly to its respective chain link.

I claim:

1. In combination, a bakery pan washer and an endless conveyor extending therethrough, said endless conveyor comprising at least a pair of horizontally extending endless chains having a plurality of links, drive means mounting said chains in substantially vertical spaced relation, a plurality of pan supporting means extending horizontally between corresponding opposed pairs of said chain links, each of said supporting means including a pair of substantially parallel rod members having their ends connected to said chain links, and depending V or U-shaped pan holding means secured to said rod members, said holding means being of graduated depth to support the lower edge of a baking pan between the rod members at an angle inclined to the horizontal.

2. In combination, a bakery pan washer and an endless conveyor extending therethrough, said endless conveyor comprising three horizontally extending substantially parallel endless chains having a plurality of links, drive means mounting said chains in substantially vertical spaced relation, a plurality of pan supporting means extending horizontally between corresponding opposed pair of said chain links, each of said supporting means including a pair of substantially parallel rod members having their ends connected to said chain links, and depending V or U-shaped pan holding means secured to said rod members, said holding means being of graduated depth to support the lower edge of a baking pan between the rod members at an angle inclined to the horizontal.

3. In combination, a bakery pan washer and an endless conveyor extending therethrough, said endless conveyor comprising at least a pair of horizontally extending endless chains having a plurality of links, drive means mounting said chains in substantially vertical spaced relation, a plurality of pan supporting means extending horizontally between corresponding opposed pairs of said chain links, each of said supporting means including a pair of rod members, means connecting said rod members in substantially parallel relation, and depending V-shaped pan holding means secured to said rod members, said holding means being of graduated depth to support the lower edge of a baking pan between the rod members at an angle inclined to the horizontal, and means connecting each of said supporting means to said opposed pairs of said chain links.

4. The combination according to claim 3 wherein said means connecting the rod members in substantially parallel relation includes an angle bracket member having an aperture bridging the ends of said rods to provide flexible connection with said chain links.

5. The combination according to claim 2 wherein each chain link has fastened thereto an end of said pan supporting means.

6. In combination, a bakery pan washer and an endless conveyor extending therethrough, said endless conveyor comprising at least a pair of horizontally spaced endless chains, drive means mounting said chains in substantially vertical spaced relation, a plurality of substantially parallel pan supporting rods extending horizontally between said chains to present a substantially flat surface therebetween upon which pans may be deposited in a horizontal position, and substantially U shaped pan supporting means depending from adjacent rods into which pans may be placed substantially vertically said U shaped pan supporting means being of a graduated depth along the length of said rods to support the lower edge of a bakery pan resting therein at an angle inclined to the horizontal.

References Cited in the file of this patent
UNITED STATES PATENTS

| | | |
|---|---|---|
| 2,840,227 | Federighi | June 24, 1958 |
| 2,981,401 | Cumming | Apr. 25, 1961 |
| 3,017,014 | Cumming | Jan. 16, 1962 |